(12) United States Patent
Jennings et al.

(10) Patent No.: US 8,585,507 B2
(45) Date of Patent: *Nov. 19, 2013

(54) EXTENDED AND EDITABLE GAMER PROFILE

(75) Inventors: Claire Jennings, Kirkland, WA (US); J. Clinton Paul Fowler, Seattle, WA (US); Kurtis Kam-Wing Chinn, Bothell, WA (US); Michal Bortnik, Seattle, WA (US); Steven D. Lamb, Woodinville, WA (US); Walter Reed Rector, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,490

(22) Filed: Jan. 13, 2012

(65) Prior Publication Data

US 2012/0116552 A1    May 10, 2012

Related U.S. Application Data

(63) Continuation of application No. 11/335,960, filed on Jan. 20, 2006, now Pat. No. 8,118,678.

(51) Int. Cl.
*A63F 9/24* (2006.01)

(52) U.S. Cl.
USPC .............................................. 463/42; 463/41

(58) Field of Classification Search
USPC .............................................. 463/43, 25–42
See application file for complete search history.

(56) References Cited

U.S. PATENT DOCUMENTS

| | | |
|---|---|---|
| 6,352,479 B1 | 3/2002 | Sparks, II |
| 6,821,205 B2 | 11/2004 | Takahashi et al. |
| 7,056,217 B1 | 6/2006 | Pelkey et al. |
| 7,076,504 B1 | 7/2006 | Handel et al. |
| 7,621,813 B2 | 11/2009 | Bortnik et al. |
| 7,887,419 B2 | 2/2011 | Bortnik et al. |
| 8,118,678 B2 | 2/2012 | Jennings et al. |
| 2002/0142842 A1 | 10/2002 | Easley et al. |
| 2002/0152244 A1 | 10/2002 | Dean et al. |
| 2002/0198735 A1 | 12/2002 | Tolbert |
| 2003/0009549 A1 | 1/2003 | Maehiro |
| 2003/0216962 A1 | 11/2003 | Heller et al. |
| 2005/0209903 A1 | 9/2005 | Hunter et al. |
| 2005/0260973 A1 | 11/2005 | Van de Groenendaal |
| 2006/0014585 A1 | 1/2006 | Neogi |
| 2006/0063590 A1 | 3/2006 | Abassi et al. |
| 2006/0121987 A1 | 6/2006 | Bortnik et al. |
| 2006/0258463 A1 | 11/2006 | Cugno et al. |
| 2007/0021213 A1 | 1/2007 | Foe et al. |
| 2007/0072678 A1 | 3/2007 | Dagres |
| 2007/0077993 A1 | 4/2007 | Midgley et al. |
| 2007/0093298 A1 | 4/2007 | Brunet |
| 2007/0099703 A1 | 5/2007 | Terebilo |
| 2007/0167217 A1 | 7/2007 | Kaminkow et al. |

OTHER PUBLICATIONS

NPL "We got next" Written by Padilla, dated Mar. 2005.
U.S. Appl. No. 11/005,674, filed Dec. 7, 2004, Bortnik, M. et al.
U.S. Appl. No. 11/006,275, filed Dec. 7, 2004, Bortnik, M. et al.
U.S. Appl. No. 11/005,768, filed Dec. 7, 2004, Bortnik, M. et al.

*Primary Examiner* — Masud Ahmed
(74) *Attorney, Agent, or Firm* — Woodcock Washburn, LLP

(57) ABSTRACT

A user profile for an online gaming service is created. The user profile contains user gaming information received from a first location. The user profile is stored in a database, and the user is permitted to access the user profile from a second location.

20 Claims, 5 Drawing Sheets

EXTENDED AND EDITABLE GAMER PROFILE

CROSS REFERENCE TO RELATED APPLICATIONS

This application is a continuation of U.S. patent application Ser. No. 11/335,960 filed on Jan. 20, 2006, now U.S. Pat. No. 8,118,678, issued Feb. 21, 2012. Which is hereby incorporated by reference in its entirety.

This application is related by subject matter to that which is disclosed in the following commonly assigned U.S. patent application Ser. No. 13/350,514, filed on Jan. 13, 2012 and entitled "Extended and Editable Gamer Profile," the entirety of which is hereby incorporated by reference herein.

BACKGROUND

Historically, a user's interaction with a game console has been specific to the game being played. For example, some games provide a profile feature in which the user can store preferences, settings and other information. If the user plays a different game, the preferences and settings need to be entered again, as the profile does not transfer across games.

In online gaming, a multimedia console user has a gamer profile that is specific to the console on which the user plays. When the user plays a game on the console, the user profile information for those games is stored locally. Thus, whenever the user plays an online game on the console, the gamer profile is accessible to each game. Unfortunately, when the user visits a website associated with an online gaming service, they cannot view, access or contribute to the locally-stored profile. In addition, a user cannot use other devices, such as a Personal Digital Assistant (PDA) or cellular telephone to view, access and/or contribute to their gamer profile, either through the web site or through other channels by which the online gaming service may be accessed.

Thus, conventional methods and systems currently lack the ability to enable a user to store a gamer profile in such a manner that the gamer profile remains accessible to the user regardless of the location from which the user accesses the gamer profile

SUMMARY

In view of the above shortcomings and drawbacks, methods, computer-readable media and systems are provided that provide user access to a user profile. In one such method, a user profile for an online gaming service is created. The user profile contains user gaming information received from a first location. The user profile is stored in a database, and the user is permitted to access the user profile from a second location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following detailed description of the various embodiments, is better understood when read in conjunction with the appended drawings. For the purpose of illustrating such embodiments, there is shown in the drawings example constructions of various embodiments; however, such embodiments are not limited to the specific methods and instrumentalities disclosed. In the drawings.

DETAILED DESCRIPTION OF ILLUSTRATIVE EMBODIMENTS

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

In one embodiment, user profile information, such as a gamer profile, is stored in an online gaming service database that is accessible to a user from at least two locations. The gamer profile may include any type of information that is relevant for gaming, and may include text, an image, audio or video information or the like. Such information may be stored in any manner. For example, the information may be stored as data fields within a database record. Non-limiting examples of different locations from which a user may access the gamer profile are a game console/PC, web site, remote device (such as, for example, a PDA or cellular telephone) or the like. Thus, according to an embodiment, a user is provided with a gamer profile that can be used across games, as well as across locations and devices.

Example Embodiments

Figure 1:
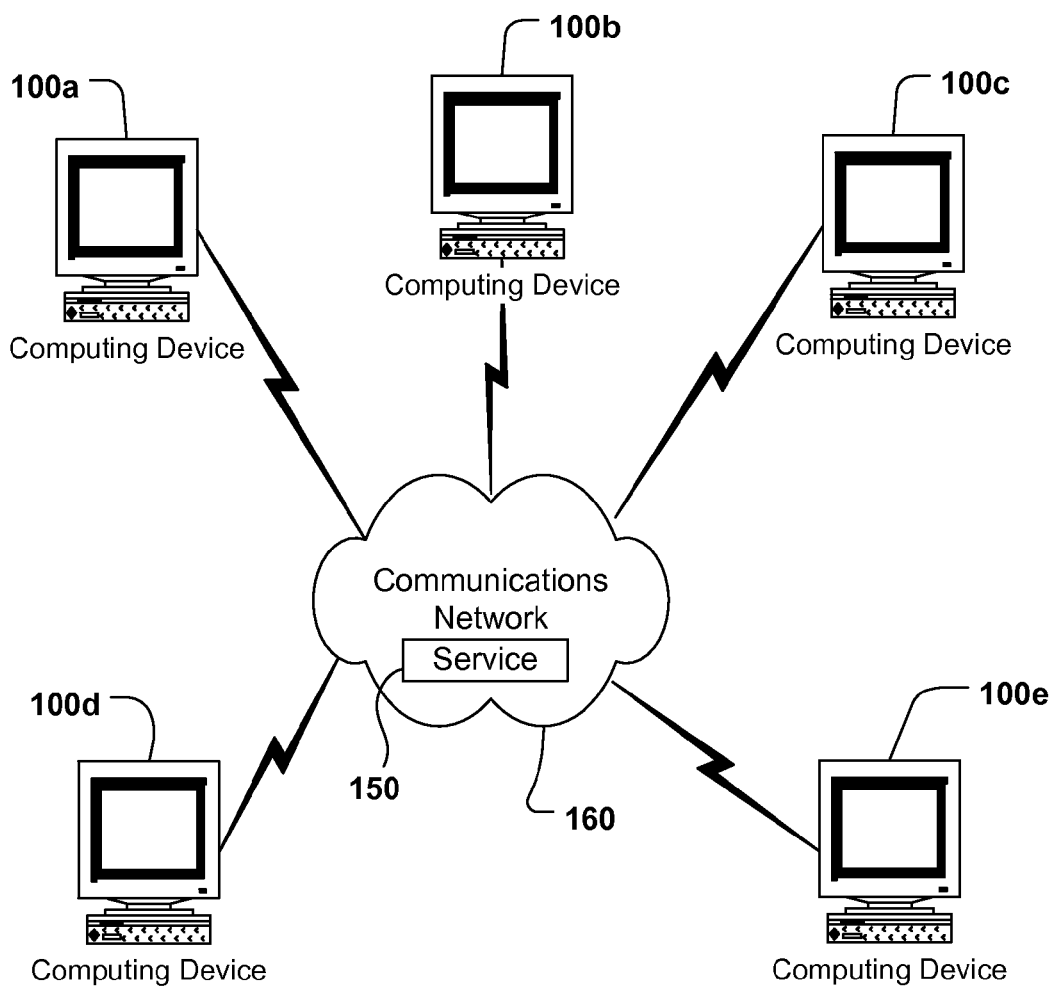
FIG. 1 is a diagram of an example computer network environment in which aspects of an embodiment may be implemented.

FIG. 1 is diagram of an example computer network in which aspects of an embodiment may be implemented. Here computers 100a-100e may host various computing objects such as games or other applications. Although the physical environment shows the connected devices as computers, such illustration is merely for explanation and may comprise various digital devices such as PDAs, game consoles, cellular telephones, etc. Moreover, communications network 160 may itself comprise a number of computers, servers and network devices such as routers and the like.

There are a variety of systems, components, and network configurations that support distributed computing environments. For example, computing systems may be connected together by wireline or wireless systems, by local networks or widely distributed networks. Currently, many of such networks are coupled to the Internet, which provides the infrastructure for widely distributed computing and may encompass many different networks. Aspects of various embodiments could be usable to distribute computer-readable instructions, code fragments, applications, and the like, to various distributed computing devices.

The network infrastructure enables a host of network topologies such as client/server, peer-to-peer, or hybrid architectures. The "client" is a member of a class or group that uses the services of another class or group to which it is not related. Thus, in computing, a client may be a process (i.e., a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server may be a remote computer system accessible over a remote network such as, for example, the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers may communicate with one another using the functionality provided by a protocol layer. For example, Hypertext-Transfer Protocol (HTTP) is a common protocol that is used in conjunction with the World Wide Web (WWW). A computer network address such as a Uniform Resource Locator (URL) or an Internet Protocol (IP) address may be used to identify the server or client computers to each other. Communication among computing devices may be provided over a communications medium. In particular, the client and server may be operatively coupled to one another by way of TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or any combination thereof that facilitates communication among a number of computing devices 100a-100e. Moreover, communication network 160 may comprise wireless, wireline or a combination of wireless and wireline connections. Additionally, the computer network may comprise a distributed computing environment. In such an environment, a computing task may be spread over a number of computing devices that are addressable elements in a computer network.

According to an embodiment, communication network 160 may host a service 150 that is accessible from the plurality of computers 100a-100e. Service 150 gathers information and tracks users of computers 100a-100e to provide computing services for all of the users of service 150.

Figure 2:
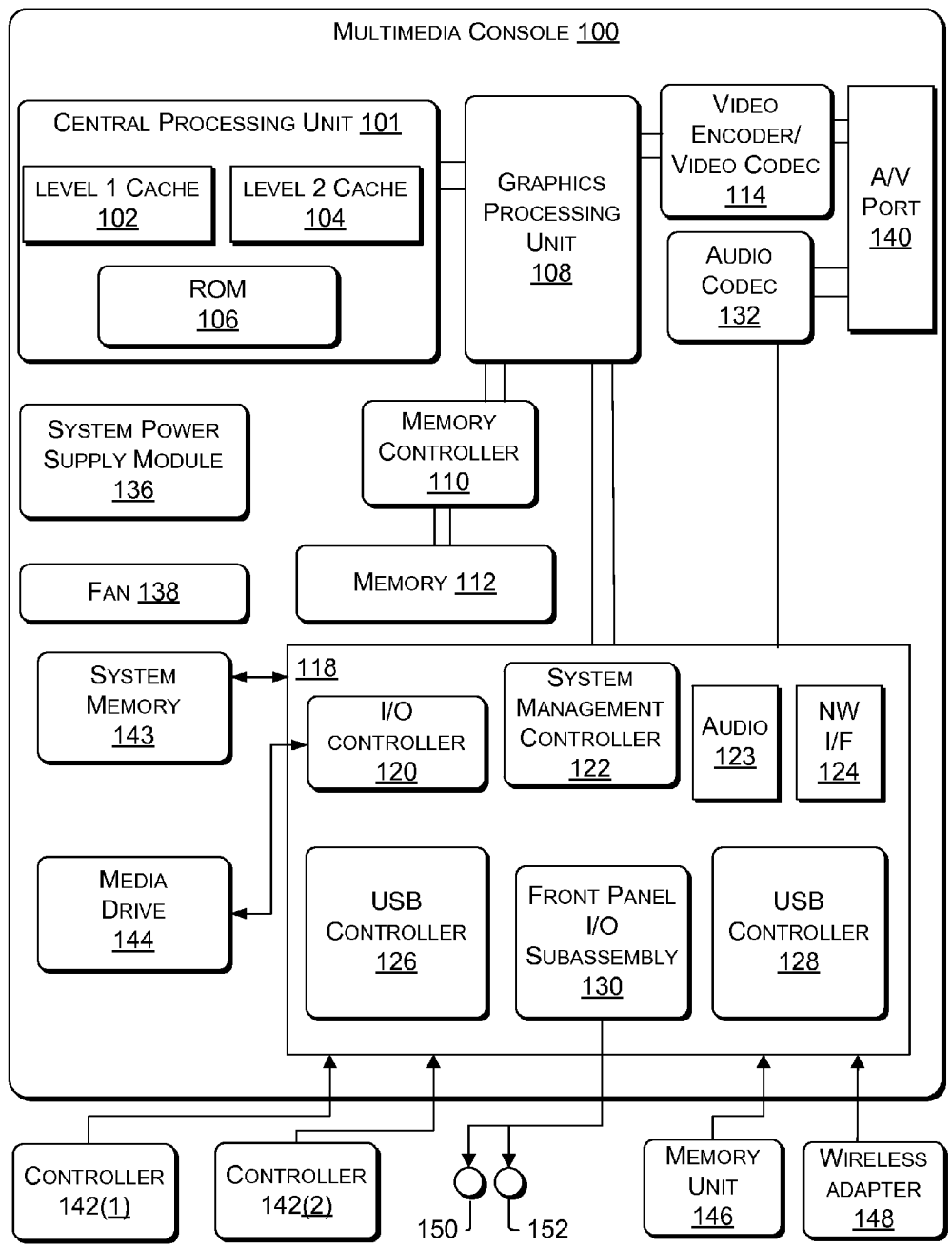
FIG. 2 is a diagram illustrating an example console that can be incorporated into a network computing environment such as the network computing environment of FIG. 1.

FIG. 2 illustrates functional components of a multimedia/gaming console 100 that may be used as computers 100a-100e in the network of FIG. 1. Multimedia console 100 has central processing unit (CPU) 101 having level 1 cache 102, level 2 cache 104 and flash ROM (Read Only Memory) 106. Level 1 cache 102 and level 2 cache 104 temporarily store data and hence reduce the number of memory access cycles, thereby improving processing speed and throughput. CPU 101 may be provided having more than one core, and thus, additional level 1 and level 2 caches 102 and 104. Flash ROM 106 may store executable code that is loaded during an initial phase of a boot process when multimedia console 100 is powered ON, for example.

Graphics processing unit (GPU) 108 and video encoder/video codec (coder/decoder) 114 form a video processing pipeline for high speed and high resolution graphics processing. Data is carried from graphics processing unit 108 to video encoder/video codec 114 via a bus. The video processing pipeline outputs data to A/V (audio/video) port 140 for transmission to a television or other display. Memory controller 110 is connected to GPU 108 to facilitate processor access to various types of memory 112, such as, but not limited to, a RAM (Random Access Memory).

Multimedia console 100 may also include I/O controller 120, system management controller 122, audio processing unit 123, network interface controller 124, first USB host controller 126, second USB controller 128 and front panel I/O subassembly 130 that are preferably implemented on module 118. USB controllers 126 and 128 serve as hosts for peripheral controllers 142(1)-142(2), wireless adapter 148, and external memory device 146 (e.g., flash memory, external CD/DVD ROM drive, removable media, etc.). Network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem and the like.

System memory 143 may be provided to store application data that is loaded during the boot process. Media drive 144 is provided and may comprise a DVD/CD drive, hard drive, or other removable media drive, etc. Media drive 144 may be internal or external to multimedia console 100. Application data may be accessed via media drive 144 for execution, playback, etc. by multimedia console 100. Media drive 144 may be connected to I/O controller 120 via a bus, such as a Serial ATA bus or other high speed connection (e.g., IEEE 1394 or the like).

System management controller 122 provides a variety of service functions related to assuring availability of multimedia console 100. Audio processing unit 123 and audio codec 132 form a corresponding audio processing pipeline with high fidelity and stereo processing. Audio data is carried between audio processing unit 123 and audio codec 132 via a communication link. The audio processing pipeline outputs data to A/V port 140 for reproduction by an external audio player or device having audio capabilities.

Front panel I/O subassembly 130 supports the functionality of power button 150 and eject button 152, as well as any LEDs (light emitting diodes) or other indicators exposed on the outer surface of multimedia console 100. System power supply module 136 provides power to the components of multimedia console 100. Fan 138 cools the circuitry within multimedia console 100.

CPU 101, GPU 108, memory controller 110 and various other components within multimedia console 100 may be interconnected via one or more buses, including serial and parallel buses, a memory bus, a peripheral bus, and a processor or local bus using any of a variety of bus architectures. By way of example, and not limitation, such architectures can include a Peripheral Component Interconnects (PCI) bus, PCI-Express bus, etc.

When multimedia console 100 is powered ON, application data may be loaded from system memory 143 into memory 112 and/or caches 102 and 104 and executed on CPU 101. The application may present a graphical user interface that provides a consistent user experience when navigating to different media types available on multimedia console 100. In operation, applications and/or other media contained within media drive 144 may be launched or played from media drive 144 to provide additional functionalities to multimedia console 100.

Multimedia console 100 may be operated as a standalone system by connecting the system to a television or other display. In this standalone mode, multimedia console 100 may allow one or more users to interact with the system, watch movies, or listen to music. However, with the integration of broadband connectivity made available through network interface 124 or wireless adapter 148, multimedia console 100 may further be operated as a participant in the larger network community as illustrated in FIG. 1.

According to an embodiment, when a game is executed on console 100, it provides information to online gaming service 150 operating on communications network 160. Online gaming service 150 may be any type of hardware and/or software that can be used to perform the tasks disclosed herein. For example, in one embodiment, online gaming service 150 may be provided by one or more software applications running on one or more computing devices, such as a server. Online gaming service 150 may track the information for all of the users connected to online gaming service 150 to provide a rich user experience. Online gaming service 150 may track user information across games, consoles, computing devices, etc. By tracking the information for all users of online gaming service 150, online gaming service 150 can aggregate statistics for all users and measure game playing ability, provide a richer user experience by providing information about friends (e.g., what game they are playing and what skill level they have attained), track user achievements and generally measure statistics for a game aggregated over a large user community.

To provide a consistent data set across games, an embodiment contemplates a schema driven process where each game generates a schema that defines the game data for a particular game. Through a game configuration process, games use a service-defined schema to describe the data the game generates about each game player. By using the configuration process, online gaming service 150 can understand the data as it flows from the game, and it will be able to integrate the data in meaningful ways with the other data that online gaming service 150 understands to create an online profile of each user of the online gaming service. The profile will follow the user wherever he or she goes on online gaming service 150, i.e., it is game and location independent. Some of the profile, in fact, may be viewable by every user of online gaming service 150. It will be appreciated that in one embodiment the profile may be created by a user during, for example, a sign in or registration process with online gaming service 150, as will be discussed below in connection with FIGS. 4-5. A user may perform such a sign in or registration by way of, for example, game console/PC 100, web site or other device such as a PDA, cellular telephone or the like.

Figure 3:
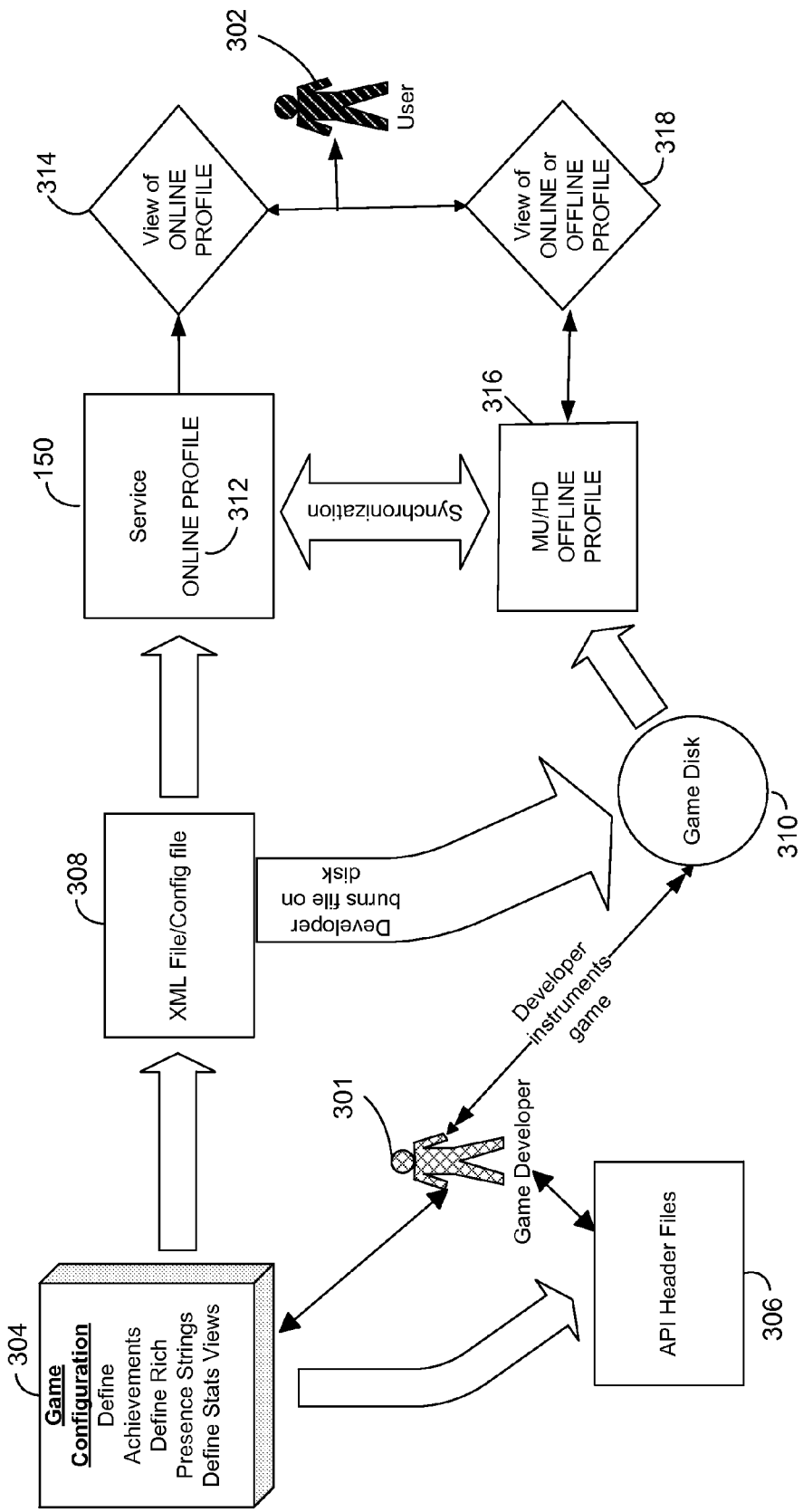
FIG. 3 illustrates an example system of allowing a game application to communicate with an online gaming service.

FIG. 3 illustrates an example process that allows a game developer to configure a game for use with online gaming service 150. In the example of FIG. 3, game developer 301 wants to create a game for use with online gaming service 150 by user 302. To that end, developer 301 provides a set of game configuration data 304 that will be shared with online gaming service 150. The output from the use of the tool may be, for example, a set of API header files 306 that are included with the game to communicate with online gaming service 150 and a set of XML files 308 that define the schema of the data to be shared with online gaming service 150. Game developer 301 then burns game disk 310 or creates a game program that contains the game code instrumented with APIs 306 and XML schema files 308 (or an equivalent representation). XML files 308 may also be communicated to online gaming service 150 so that online gaming service 150 can use the data output from the game to update online user profile 312 for user 302 when user 302 uses game 310 online, for example.

When user 302 uses game 310 without a network connection, information may be collected and stored in the user's offline profile in a hard drive or memory unit 316. Thereafter, when user 302 connects to online gaming service 150, the online and offline profile may be synchronized. User 302 can then view profile information locally 318, i.e., on console 100 or PC or log on to online gaming service 150 and view user profile 314, or may access online gaming service 150 via another connected device. Also, as explained in further detail below, the user may be able to log on to a gaming web site to view the integrated online gamer profile or create it on the web site for the first time.

Figure 4:
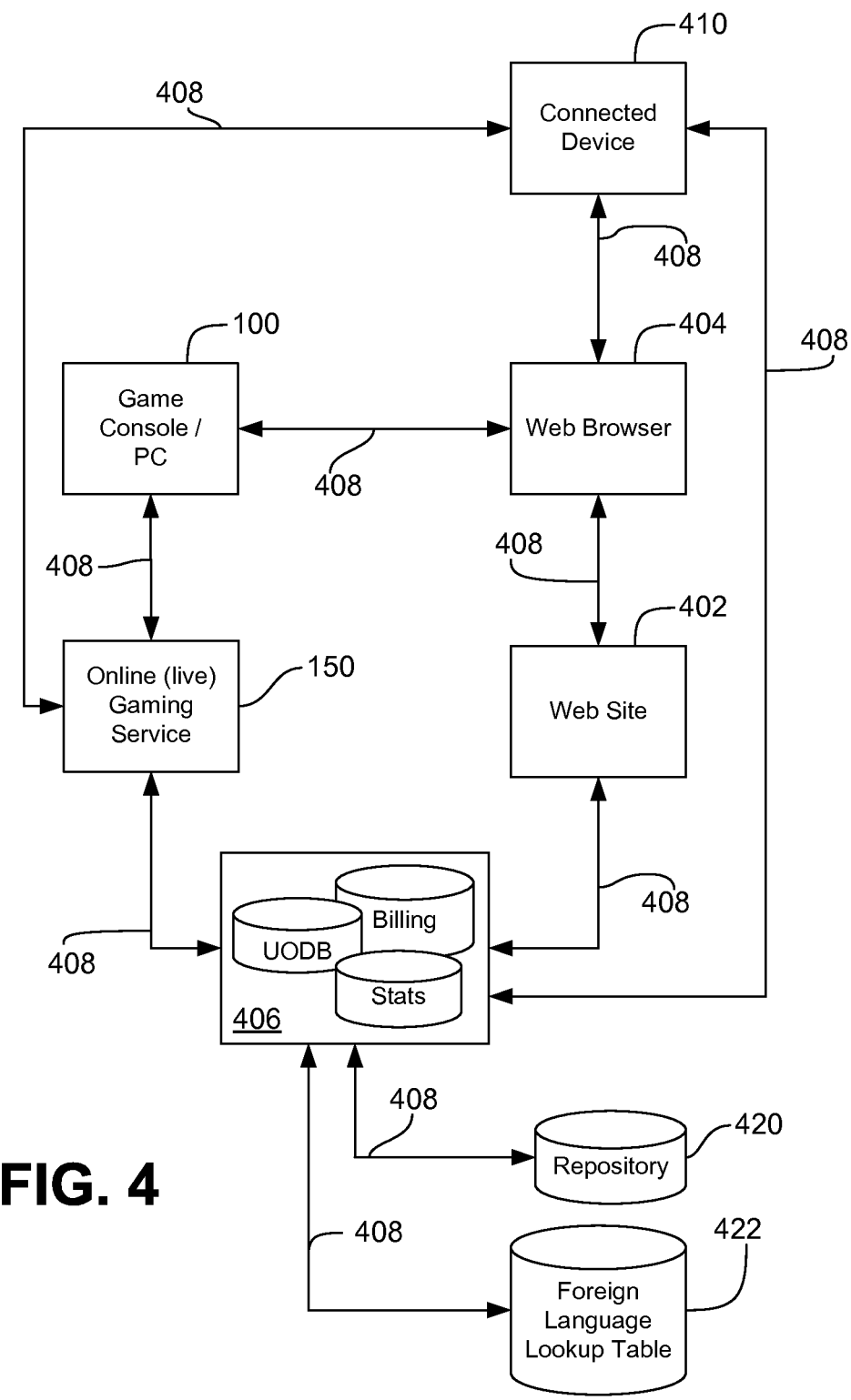
FIG. 4 illustrates an example system of providing an integrated gamer profile across an online gaming service, gaming World Wide Web (web) site and multiple devices.

FIG. 4 illustrates an example system of providing an integrated gamer profile 312 across an online gaming service 150, gaming web site 402, and multiple connected devices, for example, such as a game console or PC 100, or any connected device 410 running a web browser 404. Alternatively, device 410 may access online gaming service 150 or even online gaming service database(s) 406 directly, without the need to interact or pass through gaming web site 402. User 302 can use credentials received from creating an online profile with the online gaming service 150 to log onto a gaming web site or other web sites 402 using any web browser 404. The web browser 404 may be running on the game console/PC 100, or any device connected to the Internet. However, the use of the Internet is provided as an example, as other communication and computer networks besides the Internet may be used to communicate and modify user profile data 408 (which may be transmitted through any of the double-ended arrows that interconnect the objects depicted in FIG. 4) as described herein.

Gaming web site 402 may have online profile information for that user created from online gaming service 150 to create an online integrated profile to present at web site 402. This is because both web site 402 and online gaming service 150 may be operatively connected (for example, over a network 160 as shown in FIG. 1) to a central/synchronized online gaming service database 406 that stores and synchronizes user profile data 408 received from any of online gaming service 150, web site 402, game console/PC 100 or any connected device 410.

While any of game console/PC 100, web browser 404 or device 410 are in operative communication with online gaming service database(s) 406, such devices 100, 404 or 410 may periodically synchronize with online gaming service database(s) 406 to maintain an up-to-date integrated gamer profile. Such updating may occur dynamically, at user request, at predetermined intervals or the like. The manner of updating may be the same or different for any of devices 100, 404 or 410. In an embodiment, a single user may have more than one profile stored in online gaming service database(s) 406, or more than one user having a profile may use, for example, game console/PC 100. In such an embodiment, the updating or synchronization may update or synchronize more than one profile at a time. For example, a user having more than one profile may update some or all of the user's profiles in a single online session.

Online gaming service database 406 may in turn be operatively connected to repository 420 or foreign language lookup table 422. Repository 420 may be internal or external to online gaming service database 406 and may contain additional data that may be presented to a user. For example, in an embodiment a user may store any type of data (e.g., images, audio, video, etc.) in the user's online integrated profile. Because some of such data can be large, maintaining such data in online gaming service database 406 may adversely affect performance. Thus, in an embodiment a marker, tag, address or the like may be stored in connection with the online integrated profile in online gaming service database 406, where the tag points to the data stored in repository 420. When online gaming service database 406 is to present aspects of the online integrated profile to the user, if the data is required the tag may be used to locate the data in repository 420, which may then serve the data to online gaming service database 406. Online gaming service 150 may then present the data to the user via web site 402, game console/PC 100 or device 410, for example.

Foreign language lookup table 422 may be internal or external to online gaming service database 406. Foreign language lookup table 422 may include, for example, information that permits at least a rudimentary automated language translation of information stored in an online integrated profile, for example. Foreign language lookup table 422 may enable free-text translation or may be restricted to predefined data fields. For example, in one embodiment, some or all text information may be stored within the online profile in such predefined data fields. Translations for such data fields for one or more additional languages may be obtained and stored in foreign language lookup table 422. After accessing foreign language lookup table 422, online gaming service 150 may then present the translated profile information to the user via web site 402, game console/PC 100 or device 410, for example. Thus, in an embodiment users that speak different languages may be able to view aspects of an online integrated profile regardless of the corresponding user's native language.

Figure 5:
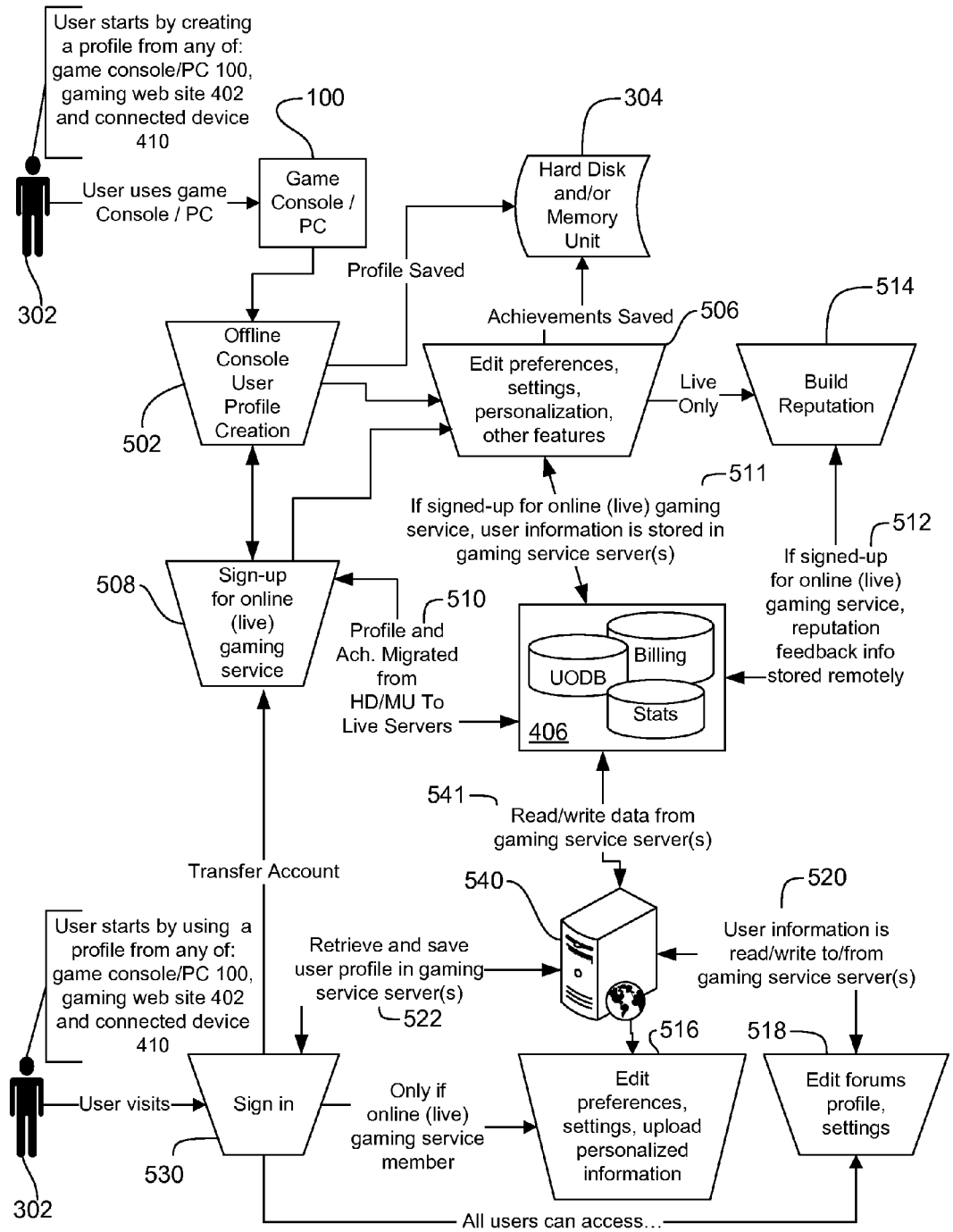
FIG. 5 is a system and flow diagram that illustrates an example creation and maintenance of an integrated gamer profile across an online gaming service, gaming web site and multiple devices.

Referring next to FIG. 5, shown is an example system and flow diagram that illustrates the creation and maintenance of an integrated gamer profile across an online gaming service 150, gaming web site 402, and one or more connected devices 410. For example, user 302 may create integrated gamer profile starting from game console/PC 100, web site 402 and/or a connected device 410. In the case of starting from game console/PC 100, for example, user 302 may first create an offline gamer profile 502 that can be stored locally on a hard drive or memory unit 304 as described above with reference to FIG. 3, for example. User 302 can play games, earn achievements, get high scores, etc. and edit 506 any or all of such information locally from game console/PC 100.

It will be appreciated that, in an embodiment, all fields within gamer profile 502, either before or after such profile 502 is stored 510 in online gaming service database(s) 406, as will be discussed below, may be editable from any device (e.g., game console/PC 100, web site 402 and/or a connected device 410). In another embodiment, one or more fields may specify the type of device from which edits will be accepted. Alternatively, such fields, or another component of profile 502, may specify user's 302 location such that user 302 must be at a specified location to edit a particular field. Alternatively, such fields may specify the device from which user 302 must access profile 502 to edit a particular field. Any number, type or combination of restrictions may be put in place with respect to one or more fields in profile 502. If user 302 has already signed up for the online gaming service, such edits may be stored 511 in the integrated gamer profile stored in online gaming service database(s) 406.

User 302 may then sign up 508 for online gaming service 150 and that offline gamer profile is now stored 510 as integrated gamer profile and is made available by central/synchronized online gaming service database(s) 406, making any or all of the games played, achievements, scores and the like available to any other user that is a member of the online gaming service. Additionally, the other members of the online gaming service can submit feedback 512 about that user 302, helping to build the user's reputation 514 within the gaming community.

Due to the integrated gamer profile information that is stored in online gaming service database(s) 406, user 302 can sign in 530 to the online gaming service using any of game console/PC 100, gaming web site 402 or connected device 410. To access the online gaming service, user 302 may sign-in to the service using credentials, such as a user name and password, (e.g., using Microsoft® Passport or the like) that may have been created when creating 508 the online gaming service account. The service may allow access the service or profile 502 when, for example, the credentials are verified. Once access has been granted, user 302 may retrieve or save 522 the integrated gamer profile. Likewise, user 302 may edit 516 the user's preferences, upload personalized information (e.g., text, an image, video, audio or the like), or perform other activities with respect to the integrated gamer profile. In addition, user 302 may edit 518 a profile associated with a forum, or other settings related to the online gaming service account, or otherwise read/write 520 to the integrated gamer profile.

Such retrieving or saving 522, or read/write 520 may take place using live cache 540. Live cache 540 may be a mechanism that is internal or external to online gaming service database(s) 406 and may communicate 541 with online gaming service database(s) 406. In such an embodiment, live cache 540 stores a recently-requested information such as, for example, integrated gamer profile information. Such information may be stored for a predetermined amount of time, a dynamically-determined amount of time, or for any other duration using any manner of measurement. Thus, when live cache 540 determines that requested information is stored within (or is accessible to) live cache 540, live cache 540 returns the information without accessing online gaming service database(s) 406. When such requested information is not stored within or accessible to live cache 540, live cache 540 communicates 541 with online gaming service database(s) 406 to retrieve the requested information. In such a manner, live cache 540 may speed up the servicing of requests to access integrated gamer profile information.

Anything that happens around the user 302, whether it is on the console/PC 100 or on the gaming web site 402, may be stored 510, 511, 512, 520 or 522 to central/synchronized online gaming service database(s) 406, enabling one integrated gamer profile that user 302 from either the console/PC 100, web site 402 or other connected device 410 can view and interact with while also allowing user 302 to maintain one identity. Such storing 510, 511, 512, 520 or 522 may, as discussed above in connection with FIG. 4, occur at user 302 request, at predetermined intervals or the like, and may involve any number of profiles 502 for any number of users 302. At any point, a game or other process of the online gaming service may access the profile data for any purpose such as, for example, conducting an online or locally-executed game, providing a user forum, etc.

The various techniques described herein may be implemented with hardware or software or, where appropriate, with a combination of both. Thus, the methods and apparatus of the various embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing an embodiment. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described embodiments may also be implemented in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the various embodiments. When implemented on a general-purpose processor, the program code combines with the processor to provide a unique apparatus that operates to perform the functionality of the various embodiments.

While the embodiments have been described in connection with the embodiments of the various figures, it is to be understood that other embodiments may be used or modifications and additions may be made to the described embodiments for performing the same functions of such embodiments without deviating therefrom. Therefore, the invention should not be limited to any single embodiment, but rather should be construed in breadth and scope in accordance with the appended claims.

What is claimed:

1. A method for providing user access to an online user profile of an online gaming service, the method comprising computer-implemented operations of:
   receiving, at a third computing device and from a first computing device, data of an offline user profile, the offline user profile having been modified locally at the first computing device while the first computing device was not logged into the online gaming service provided by the third computing device;
   modifying, by the third computing device, the online user profile for the online gaming service, the online user profile comprising information of the offline user profile;
   storing the online user profile in a database; and
   in response to receiving a request from the user at a second computing device to access the online user profile, sending the user an indication of the online user profile at the second computing device.

2. The method of claim 1, wherein said modifying is responsive to a user registration with the online gaming service.

3. The method of claim 1, wherein said sending comprises sending the user an indication that the online user profile has been edited in response to an indication of editing received from the second computing device.

4. The method of claim 3, wherein said sending the user an indication that the online user profile has been edited comprises:
   determining that editing the online user profile from the second computing device is permissible based on a field of the online user profile.

5. The method of claim 1, further comprising:
   receiving user gaming information for a first game from the first computing device; and
   storing an indication of the user gaming information in the online user profile as at least one data field, and wherein said at least one data field comprises a tag, wherein said tag indicates a location of data stored in a repository.

6. The method of claim 1, wherein said modifying comprises receiving user gaming information for a first game from the offline user profile stored at the first computing device.

7. The method of claim 1, wherein the first computing device comprises a personal computer, a gaming console, a web site, a personal digital assistant, or a cellular telephone.

8. The method of claim 7, wherein the second computing device is a different one of the set.

9. The method of claim 1, wherein the online user profile comprises user gaming information of a first game, the user gaming information including at least one from a set, the set comprising text information, an image, audio information and video information.

10. The method of claim 1, wherein the user is a first user, and further comprising: sending an indication of the online user profile of the first user to a second user.

11. The method of claim 10, further comprising:
    detecting a first language associated with the online user profile of the first user and a second language associated with the second user;
    detecting a second user selection of a data field within the online user profile of the first user;
    accessing a lookup table to convert the data field to the second language; and
    in response to receiving a request to access the data field from the second user, sending the second user an indication of the converted data field.

12. The method of claim 1, wherein said sending comprises receiving at least one user credential and sending said user the indication of the online user profile upon verifying the at least one user credential.

13. A system for providing user access to an online user profile of an online gaming service, the system comprising:
    a processor; and
    a memory communicatively coupled to the processor, the memory bearing processor-executable instructions that, when executed on the processor, cause the system at least to:
      receive, from a first computing device, data of an offline user profile, the offline user profile having been modified locally at the first computing device while the first computing device was not logged into an online gaming service provided by the third computing device;
      modify the online user profile for the online gaming service, the online user profile comprising information of the offline user profile;
      store the online user profile in a database; and
      in response to receiving a request from the user at a second computing device to access the online user profile, send the user an indication of the online user profile at the second computing device.

14. The system of claim 13, wherein the memory further bears processor-executable instructions that, when executed on the processor, cause the system at least to:
    receive user gaming information for a first game from the first computing device; and store an indication of the user gaming information in the online user profile as at least one data field, and wherein said at least one data field comprises a tag, wherein said tag indicates a location of data stored in a repository.

15. The system of claim 13, wherein the user is a first user, and wherein the memory further bears processor-executable instructions that, when executed on the processor, cause the system at least to:
   send an indication of the online user profile of the first user to a second user;
   detect a first language associated with the online user profile of the first user and a second language associated with the second user;
   detect a second user selection of a data field within the online user profile of the first user;
   access a lookup table to convert the data field to the second language; and
   in response to receiving a request to access the data field from the second user, send the second user an indication of the converted data field.

16. A computer-readable storage medium having a physical structure, having computer-readable instructions for managing an online user profile that, when executed upon a computer, cause the computer to perform operations comprising:
   receiving, from a first computing device data of an offline user profile, the offline user profile having been modified locally at the first computing device while the first computing device was not logged into an online gaming service provided by the third computing device;
   modify the online user profile for the online gaming service;
   updating the online user profile with data received for a first game in an online gaming service-defined schema of an online gaming service;
   updating the online user profile with data received for a second game in the online gaming service-defined schema;
   storing the online user profile in a database; and
   in response to receiving a request from the user at a second computing device to access the online user profile, sending the user an indication of the online user profile at the second computing device.

17. The computer-readable storage medium having a physical structure of claim 16, wherein the user gaming information is stored in the online user profile as at least one data field, and wherein said online user profile indicates that one of the at least one data fields is editable only if the user accesses the online user profile from the first location.

18. The computer-readable storage medium having a physical structure of claim 16, wherein the first location is at least one from a set, the set comprising: a personal computer, a gaming console, a web site, a personal digital assistant and a cellular telephone.

19. The computer-readable storage medium having a physical structure of claim 16, wherein the user is a first user, and further comprising computer-readable instructions that, when executed upon the computer, cause the computer to perform operations comprising:
   sending an indication of the online user profile of the first user to a second user.

20. The computer-readable storage medium having a physical structure of claim 19, further comprising computer-readable instructions that, when executed upon the computer, cause the computer to perform operations comprising:
   detecting a first language associated with the online user profile of the first user and a second language associated with the second user;
   detecting a second user selection of a data field within the online user profile of the first user;
   accessing a lookup table to convert the data field to the second language; and
   in response to receiving a request to access the data field from the second user, sending the second user an indication of the converted data field.

* * * * *